US007878695B2

(12) United States Patent
Ishida

(10) Patent No.: US 7,878,695 B2
(45) Date of Patent: Feb. 1, 2011

(54) LIGHTING UNIT FOR VEHICLE HEADLAMP INCLUDING CONVEX LENS ARRANGED BETWEEN LIGHT SOURCE AND SHADE

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 167 days.

(21) Appl. No.: 12/121,937

(22) Filed: May 16, 2008

(65) Prior Publication Data

US 2008/0285297 A1 Nov. 20, 2008

(30) Foreign Application Priority Data

May 17, 2007 (JP) ............................ 2007-131281

(51) Int. Cl.
*B60Q 1/04* (2006.01)
*B60Q 1/16* (2006.01)

(52) U.S. Cl. .................. 362/539; 362/547; 362/296.01; 362/307; 362/309; 362/329

(58) Field of Classification Search ................. 362/507, 362/539, 545, 547, 296.01, 307, 309, 327, 362/329

See application file for complete search history.

(56) References Cited

U.S. PATENT DOCUMENTS 2,215,900 A * 9/1940 Bitner ........................ 362/309
4,727,458 A * 2/1988 Droste et al. ................ 362/539
4,772,987 A * 9/1988 Kretschmer et al. .......... 362/539
5,091,830 A * 2/1992 Suzuki ........................ 362/539
5,894,196 A * 4/1999 McDermott ................. 313/512
6,540,387 B2 * 4/2003 Hashiyama et al. ......... 362/538
6,547,423 B2 * 4/2003 Marshall et al. ............. 362/333
6,724,543 B1 * 4/2004 Chinniah et al. ............ 359/718
7,188,984 B2 * 3/2007 Sayers et al. ................ 362/545
7,270,454 B2 * 9/2007 Amano ........................ 362/522
7,401,948 B2 * 7/2008 Chinniah et al. ............ 362/326
7,473,013 B2 * 1/2009 Shimada ...................... 362/327
2004/0233678 A1 * 11/2004 Ishida et al. ................ 362/539

FOREIGN PATENT DOCUMENTS

JP 2003-317515 A 11/2003

* cited by examiner

*Primary Examiner*—Ismael Negron
(74) *Attorney, Agent, or Firm*—Sughrue Mion, PLLC

(57) ABSTRACT

A lighting unit with a projection lens, a light source, a reflector, a shade, and a convex lens. The projection lens is arranged on an optical axis extending in a longitudinal direction of a vehicle. The light source is arranged on a rear side of a rear side focal point of the projection lens. The reflector reflects forward light from the light source toward the optical axis. An upper end edge of the shade passes through a vicinity of the rear side focal point. The shade shields part of a reflected light from the reflector. The convex lens is arranged between the light source and the shade, and converges light from the light source into the vicinity of the upper end edge of the shade.

4 Claims, 10 Drawing Sheets

LIGHTING UNIT FOR VEHICLE HEADLAMP INCLUDING CONVEX LENS ARRANGED BETWEEN LIGHT SOURCE AND SHADE

This application claims foreign priority from Japanese Patent Application No. 2007-131281 filed on May 17, 2007, the entire contents of which are hereby incorporated by reference.

BACKGROUND OF THE INVENTION

1. Field of the Invention

The present invention relates to a lighting unit for a vehicle headlamp and, more particularly, to a projector type lighting unit constructed to form a low-beam light distribution pattern.

2. Background Art

Commonly, the projector type lighting unit used in the vehicle headlamp is constructed such that a projection lens is arranged on an optical axis extending in the longitudinal direction of a vehicle, then a light source is arranged on the rear side of a rear side focal point, and then a light from the light source is reflected by a reflector toward the optical axis.

When the low-beam light distribution pattern is formed by the projector type lighting unit, a part of the reflected light from the reflector is shielded by a shade that is arranged to pass its upper end edge near the rear side focal point of the projection lens, and thus a predetermined cut-off line is formed on an upper end portion of the low-beam light distribution pattern.

In "Patent Document 1", the projector type lighting unit employing a light emitting element arranged to direct upward as the light source is set forth.

In the projector type lighting unit in "Patent Document 1", a mirror member whose upward reflecting surface for reflecting a part of the reflected light from the reflector to the upward side is provided between the reflector and the projection lens and also whose front end edge is formed to pass through the rear side focal point of the projection lens is provided. Thus, a part of the reflected light from the reflector is reflected to the upward side by the mirror member such that the low-beam light distribution pattern having a cut-off line as a reversed projection image of the front end edge of the upward reflecting surface on its upper end portion is formed.

[Patent Document 1] JP-A-2003-317515

When the projector type lighting unit equipped with such mirror member in "Patent Document 1" is employed, the low-beam light distribution pattern having the clear cut-off line on its upper end portion can be formed, while enhancing a utility factor of a luminous flux of the light from the light emitting element.

However, the projector type lighting unit is constructed such that a light source image formed on a rear side focal plane of the projection lens is projected forward by the reflected light from the reflector. Therefore, as the lighting unit in "Patent Document 1", even when the lighting unit is constructed to reflect a part of the reflected light from the reflector to the upward side by the mirror member, neither a brightness of a hot zone (i.e., high luminous intensity area) of the low-beam light distribution pattern formed in this manner can be increased largely, nor a highest luminous intensity position can be set in a position in vicinity of the cut-off line.

As a result, such a problem existed that a visibility of the far area on the road surface in front of the vehicle cannot sufficiently enhanced.

SUMMARY OF THE INVENTION

One or more embodiments of the invention provide a lighting unit capable of enhancing satisfactorily a visibility of a far area on the road surface in front of a vehicle when a projector type lighting unit is employed as a lighting unit for a vehicle headlamp.

In accordance with one or more embodiments of the invention, a lighting unit is provided with: a projection lens arranged on an optical axis extending in a longitudinal direction of a vehicle; a light source arranged on a rear side of a rear side focal point of the projection lens; a reflector configured to reflect forward a light from the light source toward the optical axis; a shade arranged such that an upper end edge of the shade passes through a vicinity of the rear side focal point and configured to shield a part of a reflected light from the reflector; and a convex lens arranged between the light source and the shade and configured to converge the light from the light source into the vicinity of the upper end edge of the shade.

The type of the "light source" is not particularly limited. For example, a light emitting chip of a light emitting element such as a light emitting diode, a laser diode, or the like, a discharge emitting portion of a discharge bulb, a filament of a halogen bulb, or the like may be employed. Also, the "light source" may be arranged on the optical axis, or may be arranged in a position that is deviated from the optical axis. In addition, the direction of the "light source" is not limited to the particular direction if such direction can be set within a predetermined range such that the light from the light source can be incident on the reflector and the convex lens.

In the "reflector", concrete shape, arrangement, and the like of the reflecting surface are not particularly limited if they are constructed such that the light from the light source is reflected forward to go toward the optical axis.

In the "convex lens", concrete lens shape, arrangement, and the like are not particularly limited if such lens is provided between the light source and the shade and is constructed such that the light from the light source can be converged onto the vicinity of the upper end edge of the shade. At that time, the wording "the vicinity of the upper end edge of the shade" on which the light from the light source is converged may be positioned near the optical axis or may be positioned remotely from the optical axis in the lateral direction.

The lighting unit according to one or more embodiments of the present invention is constructed as the projector type lighting unit having the shade, the low-beam light distribution pattern having the clear cut-off line at its upper end portion can be formed.

Besides, in the lighting unit according to one or more embodiments of the present invention, the convex lens for converging the light from the light source into the vicinity of the upper end edge of the shade is provided between the light source and the shade. Therefore, the bright light source image can be formed on the vicinity of the upper end edge of the shade on the rear side focal plane of the projection lens by this convex lens. Therefore, a brightness of the hot zone of the low-beam light distribution pattern that is formed by the light emission from the lighting unit can be increased largely rather than the case where the low-beam light distribution pattern is formed only by the reflected light from the reflector, and also the highest luminous intensity position can be set in the position near the cut-off lines. As a result, a visibility of the far area on the road surface in front of the vehicle can be enhanced satisfactorily.

According to the embodiments of the present invention, a visibility of the far area on the road surface in front of the vehicle can be enhanced satisfactorily when the projector type lighting unit is employed as the lighting unit for the vehicle headlamp.

In the above configuration, as described above, the concrete configuration of the reflector is not particularly limited. For instance, when such a configuration is employed that the reflector is arranged to cover the light source and the convex lens from the top side, and the additional reflector for reflecting the light from the light source to the convex lens is provided on the lower side of the light source, not only the whole shape of the low-beam light distribution pattern is formed by the reflected light from the reflector, but also the image of the light source reflected by the additional reflector can be focused substantially on the upper area of the upper end edge of the shade by the convex lens and then can be projected forward by the projection lens. Accordingly, the light distribution pattern that is one size larger than the hot zone can be formed to overlap with the hot zone. As a result, a brightness of the hot zone and a brightness of its peripheral area can be increased further more.

In the above configuration, as described above, the type, the arrangement, etc. of the light source are not limited particularly. In this case, in case the light source is constructed by the light emitting chip of the light emitting element arranged to direct forward, employment of the configuration of the present invention is particularly effective for following reasons.

That is, most of the emergent light from the light emitting chip of the light emitting element arranged to direct forward is not incident on the reflector and goes to the front side space. In this situation, since most of the light traveling to the front side space is incident on the convex lens, a utility factor of the luminous flux of the light from the light emitting element can be enhanced.

In such case, when the light emitting element is supported by the metal supporting plate extending along a vertical plane that intersects orthogonally with the optical axis Ax and also a plurality of radiating fins are formed on the back surface of this supporting plate, this supporting plate can be practically used as a heat sink. In addition, since a distance from the light emitting element arranged to direct forward to a plurality of radiating fins is very short, a heat radiation effect of the heat sink can be extremely enhanced.

In the above configuration, when the reflector is constructed by a translucent member that is formed integrally with the convex lens and also the reflector is constructed to have the inner peripheral side surface that extends backward from the outer peripheral edge of the rear-side surface of the convex lens, the outer peripheral side surface for internal-reflecting forward the light from the light source and incident from the inner peripheral side surface by virtue of a total reflection and the front side surface for emitting the reflected light from the outer peripheral side surface forward, following advantages and effects can be achieved.

That is, the light, which is not incident on the convex lens and goes to its outer peripheral space, out of the emergent light from the light source can be incident on the reflector from the inner peripheral side surface of the reflector. At that time, since the light incident on the reflector near the outer peripheral edge of the convex lens is refracted largely by the inner peripheral side surface in the direction to go away from the optical axis, such light can arrive at the outer peripheral side surface of the reflector. Then, when the light being internal-reflected by the outer peripheral side surface by virtue of a total reflection is emergent from the front side surface of the reflector 116, such light can be utilized as the forward emission light. Therefore, a utility factor of the luminous flux of the light from the light source can be enhanced.

Other aspects and advantages of the invention will be apparent from the following description, the drawings and the claims.

BRIEF DESCRIPTION OF THE DRAWINGS

FIGS. 4A and 4B are view similar to FIG. 2, wherein FIG. 4A is a view showing optical paths of a light, which is incident on a convex lens, out of an emergent light from a light emitting device, and FIG. 4B is a view showing optical paths of a light, which is incident on a reflector or an additional reflector, out of the emergent light from the light emitting device.

DETAILED DESCRIPTION OF THE EXEMPLARY EMBODIMENTS

Exemplary embodiments of the present invention will be explained with reference to the drawings hereinafter.

Figure 1:
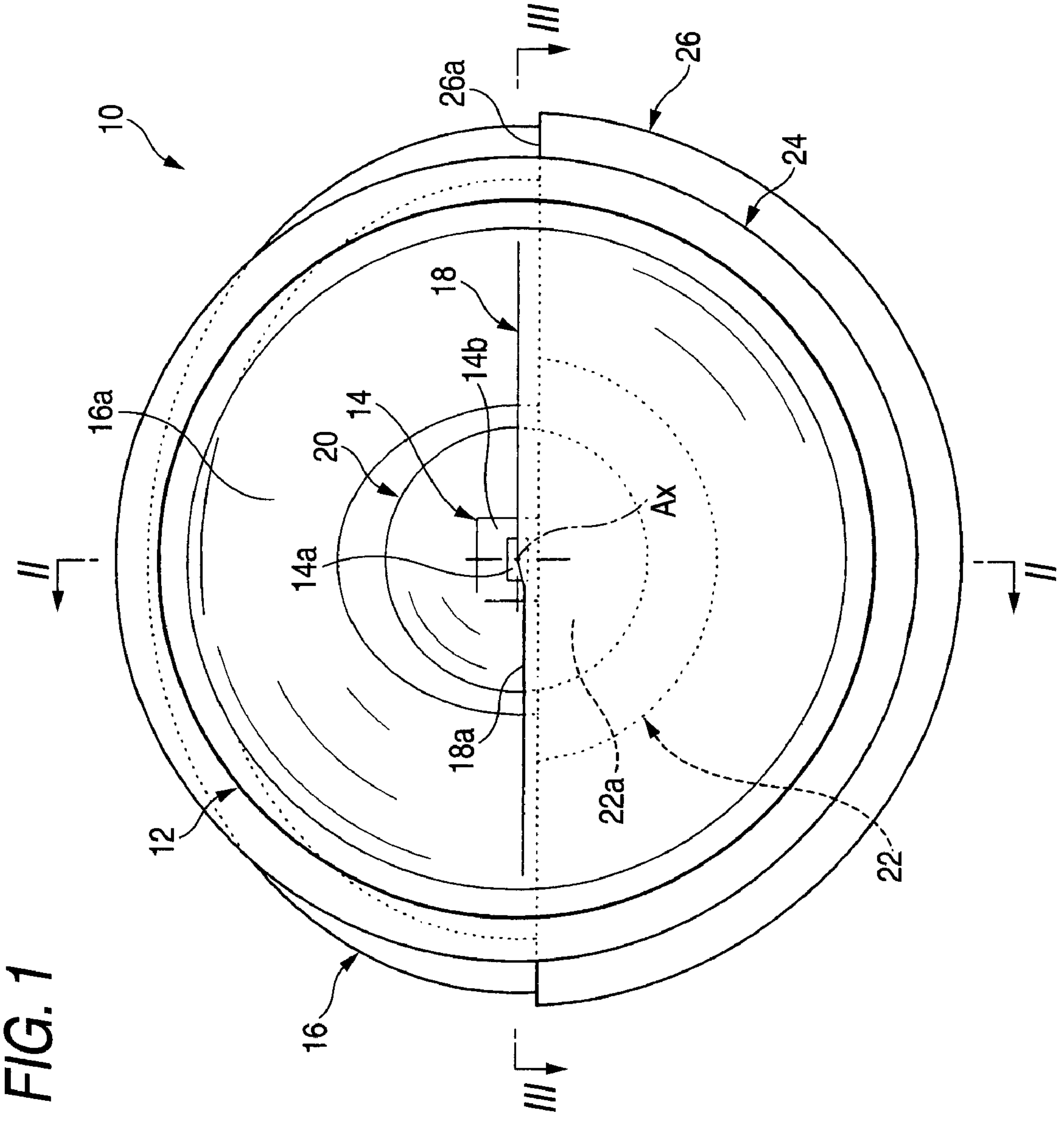
FIG. 1 is a front view showing a lighting unit for a vehicle headlamp according to an embodiment of the present invention.
Figure 2:
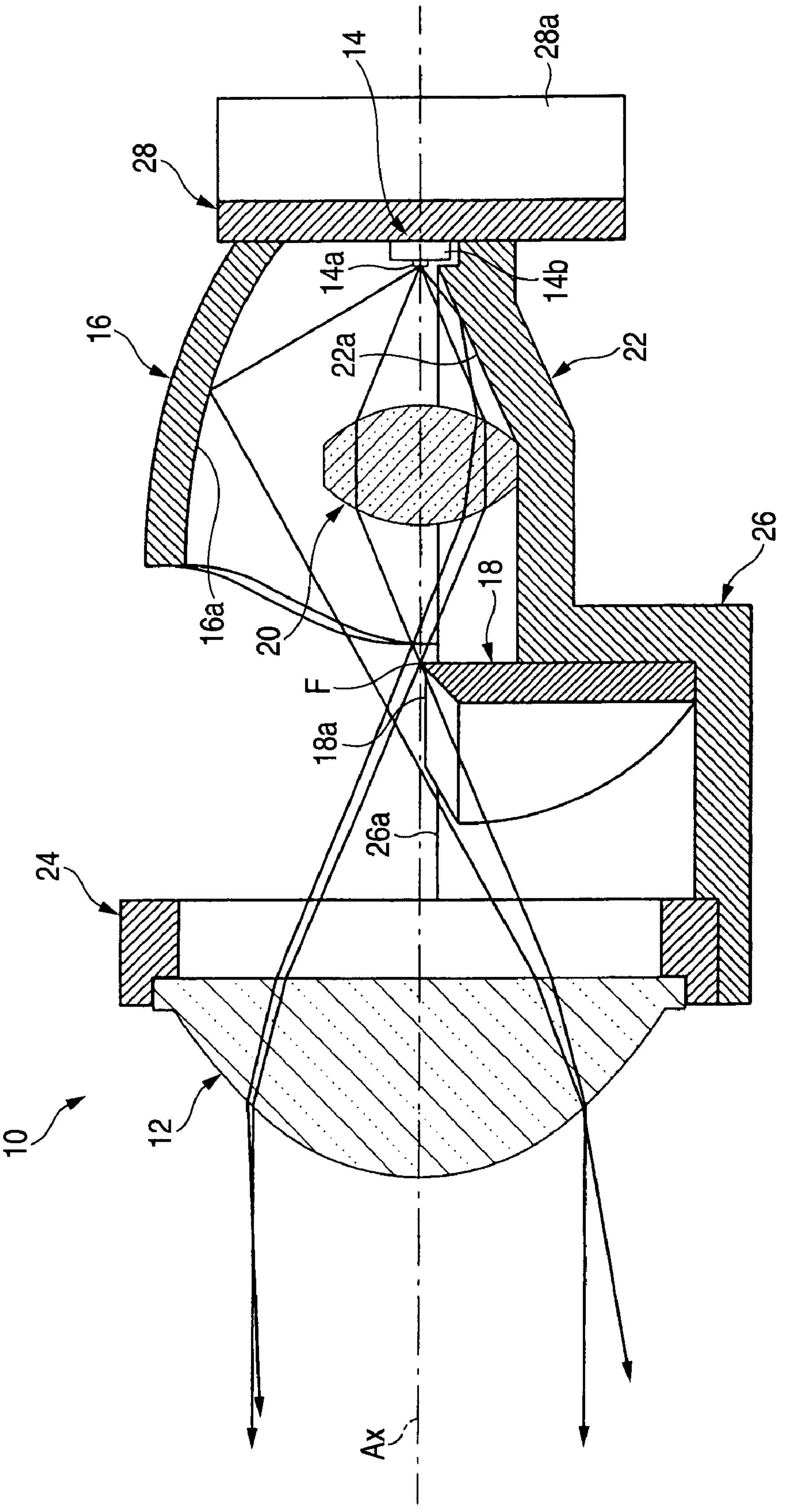
FIG. 2 is a sectional view taken along an II-II line in FIG. 1.
Figure 3:
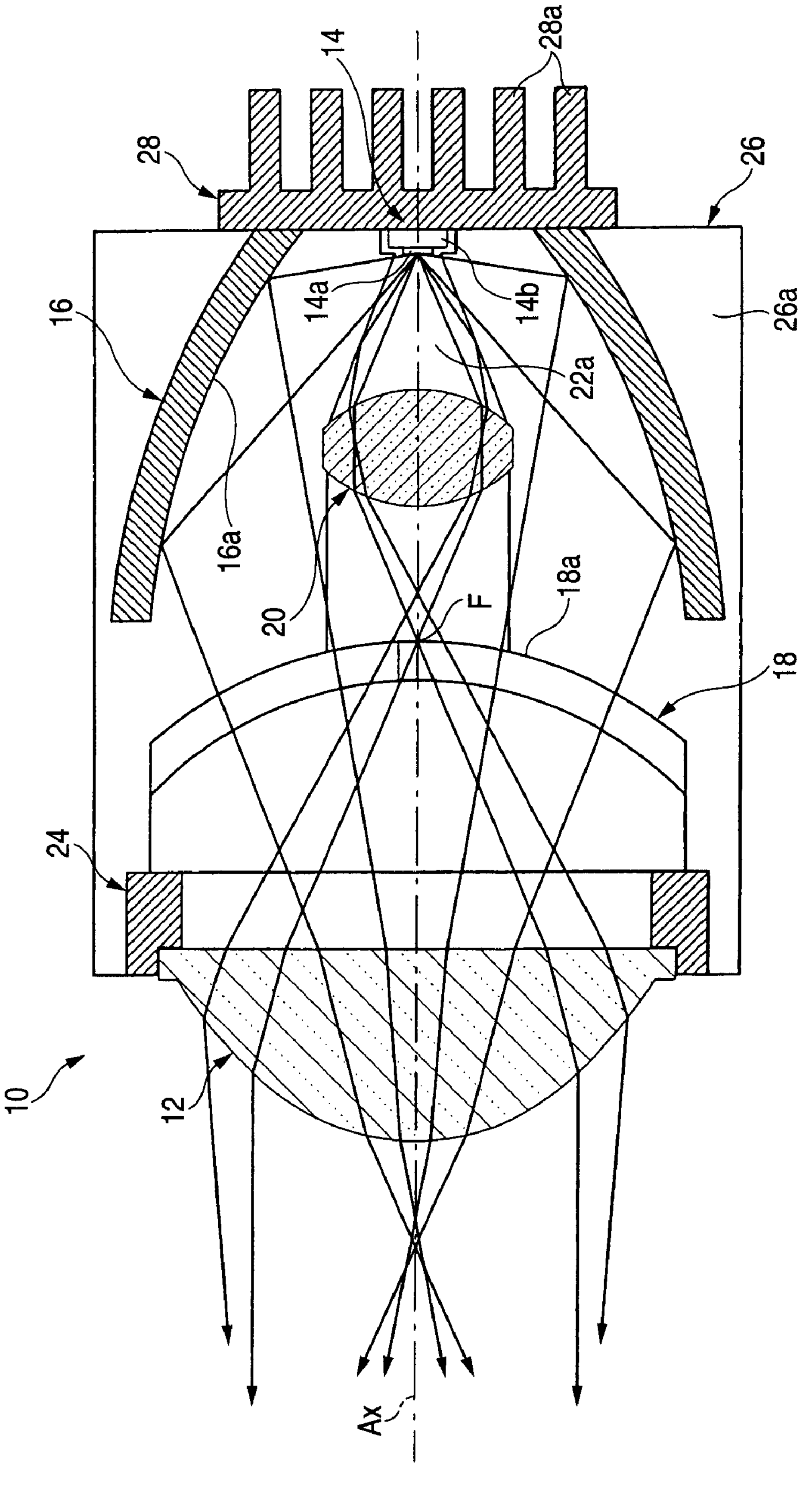
FIG. 3 is a sectional view taken along an III-III line in FIG. 1.

FIG. 1 is a front view showing a lighting unit for a vehicle headlamp according to an embodiment of the present invention. Also, FIG. 2 is a sectional view taken along an II-II line in FIG. 1, and FIG. 3 is a sectional view taken along an III-III line in FIG. 1.

As shown in these Figures, a lighting unit 10 according to the present embodiment is constructed as a projector type lighting unit that includes a projection lens 12 arranged on an optical axis Ax that extends in the longitudinal direction of a vehicle, a light emitting element 14 arranged on the rear side of a rear side focal point F of the projection lens 12, a reflector 16 arranged to cover the light emitting element 14 from the top side, for reflecting the light from the light emitting element 14 forward to go toward the optical axis Ax, and a shade 18 whose upper end edge 18*a* is arranged to pass through the rear side focal point F of the projection lens 12, for shielding apart of the reflected light from the reflector 16.

Also, in this lighting unit 10, a convex lens 20 is provided between the light emitting element 14 and the shade 18. Also, an additional reflector 22 for reflecting the light from the light emitting element 14 toward the convex lens 20 is provided near the lower side of the light emitting element 14.

This lighting unit 10 is used in a state that this unit is incorporated as a part of the vehicle headlamp. In a state that this unit is incorporated into the vehicle headlamp, the lighting unit 10 is arranged such that its optical axis Ax extends in the downward direction at an angle of about 0.5 to 0.6° to the longitudinal direction of the vehicle. Then, this lighting unit 10 gives a light emission to form the leftward-directed low-beam light distribution pattern.

The projection lens 12 is formed of a plano-convex aspheric lens whose front-side surface is a convex surface and whose rear-side surface is a flat surface. The projection lens 12 projects a light source image, which is formed on a rear side focal plane (i.e., a focal plane containing the rear side focal point F) of the projection lens, on a virtual vertical screen in front of the lighting equipment. The projection lens 12 is fixed to a ring-like lens holder 24 and supported by this holder. Also, this lens holder 24 is fixed to a base member 26 and supported by this member.

The light emitting element 14 is a white light emitting element. The light emitting element 14 is formed of a light emitting chip 14*a* having an oblong rectangular light emitting surface of an about 1 mm×2 mm square, and a substrate 14*b* for supporting the light emitting chip 14*a*. At that time, the light emitting chip 14*a* acting as a light source is sealed with a thin film that is formed to cover the light emitting surface. This light emitting element 14 is fixed to and supported by a supporting plate 28 via the substrate 14*b* in a state that the light emitting chip 14*a* is arranged on the optical axis Ax to direct forward.

This supporting plate 28 extends along a vertical plane that intersects orthogonally with the optical axis Ax. A plurality of radiating fins 28*a* extending in the vertical direction are formed on its rear surface. This supporting plate 28 is fixed to and supported by the base member 2.

The convex lens 20 is arranged on the optical axis Ax such that this lens is positioned at an almost middle point between a luminescent center of the light emitting element 14 and the rear side focal point F of the projection lens 12. Accordingly, the convex lens 20 converges the light from the light emitting chip 14*a* to the vicinity of the rear side focal point F (i.e., the vicinity of the upper end edge 18*a* of the shade 18). This convex lens 20 is fixed to and supported by the base member 26.

The reflector 16 is arranged to cover the light emitting chip 14*a* and the convex lens 20. A reflecting surface 16*a* of the reflector 16 is constructed by a curved line whose sectional shape taken along a vertical plane to contain the optical axis Ax is formed such that the light from the light emitting chip 14*a* is converged substantially into a point located slightly ahead of the rear side focal point F of the projection lens 12. Also, a sectional shape taken along a horizontal plane to contain the optical axis Ax is constructed by a curved line that is formed such that the light from the light emitting chip 14*a* is converged substantially into a point located considerably ahead of the rear side focal point F of the projection lens 12. Also, a sectional shape taken along an oblique plane positioned in the middle is constructed by an intermediate curved line between both curved lines.

At that time, an inner peripheral shape of the reflector 16 is set at the rear end edge such that the light from the light emitting chip 14*a* and reflected by the reflecting surface 16*a* passes through an outer peripheral space of the convex lens 20 and is incident on the projection lens 12. Also, a front end edge of the reflecting surface 16*a* is formed such that both right and left side portions extend frontward longer than its upper portion over the optical axis Ax. Also, a lower end edge of the light emitting chip 14*a* extends up to a position located slightly below a horizontal plane containing the optical axis Ax. A lower end surface of this reflector 16 is fixed to and supported by the base member 26.

The shade 18 extends horizontally along the rear side focal plane to have a different level on right and left sides respectively such that the upper end edge 18*a* passes through the rear side focal point F of the projection lens 12. That is, a left-side area of the upper end edge 18*a*, which is positioned on the left side (the right side when viewed from the front side of the lighting equipment) as the own lane side from the optical axis Ax, is constructed by a horizontal plane containing the optical axis Ax. Also, a right-side area of the upper end edge 18*a*, which is positioned on the right side as the opposite lane side from the optical axis Ax, is constructed by another horizontal plane, which is formed lower by one step than the left-side area, via an intermediate oblique plane that extends obliquely downward from the optical axis Ax. Thus, the shade 18 removes most of the upward-directed light that is emitted frontward from the reflector 16. This shade 18 is also fixed to and supported by the base member 26.

A reflecting surface 22*a* of the additional reflector 22 is formed as an almost circular cone-like curved surface that extends from an outer periphery of the rear surface of the convex lens 20 to an outer peripheral edge of the light emitting chip 14*a* of the light emitting element 14. At that time, since the light emitting chip 14*a* has the oblong rectangular light emitting surface, an inclination angle of the reflecting surface 22*a* in a sectional position that is close to the horizontal plane on both right and left sides of the light emitting chip 14*a* is set smaller than that in a sectional position that is close to the vertical plane under the light emitting chip 14*a*. The additional reflector 22 is formed integrally with the base member 26.

The base member 26 is shaped such that a hollow portion is cut downward partially in the plate arranged horizontally. An upper surface 26*a* supports the reflector 16, and respective portions of the hollow portion support the lens holder 24, the shade 18, and the convex lens 20. Also, the reflecting surface 22*a* of the additional reflector 22 is formed as a part of the hollow portion of this base member 26. A front portion of the convex lens 20 on the base member 26 is formed as an almost semi-cylindrical concave portion along the outer peripheral shape of the convex lens 20, not to shield the emergent light from the convex lens 20.

Figure 4A:
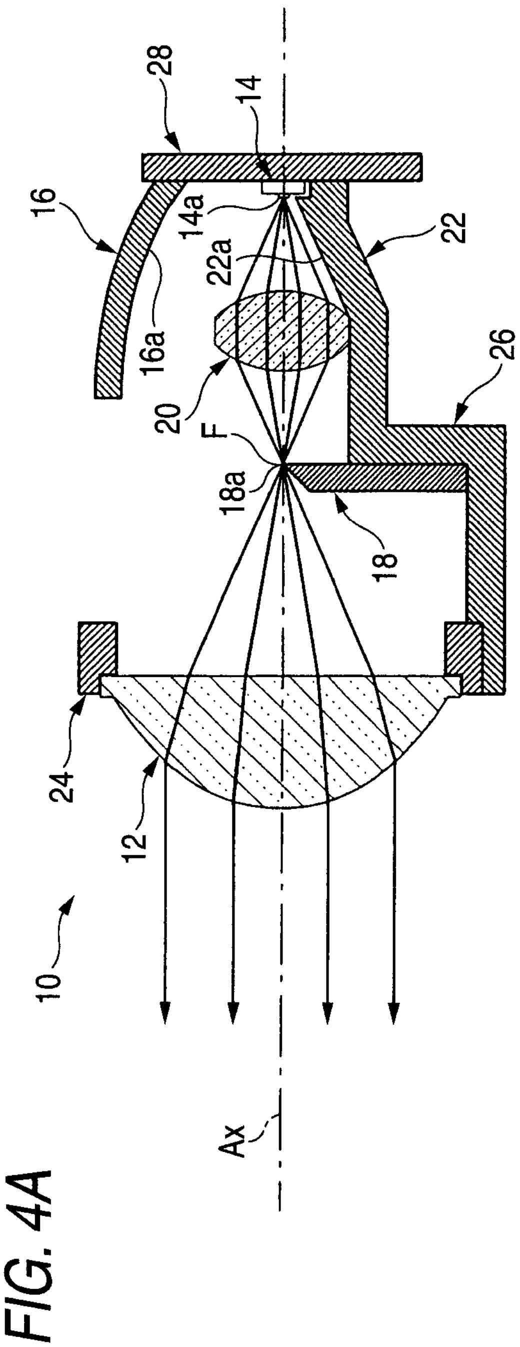
Figure 4B:
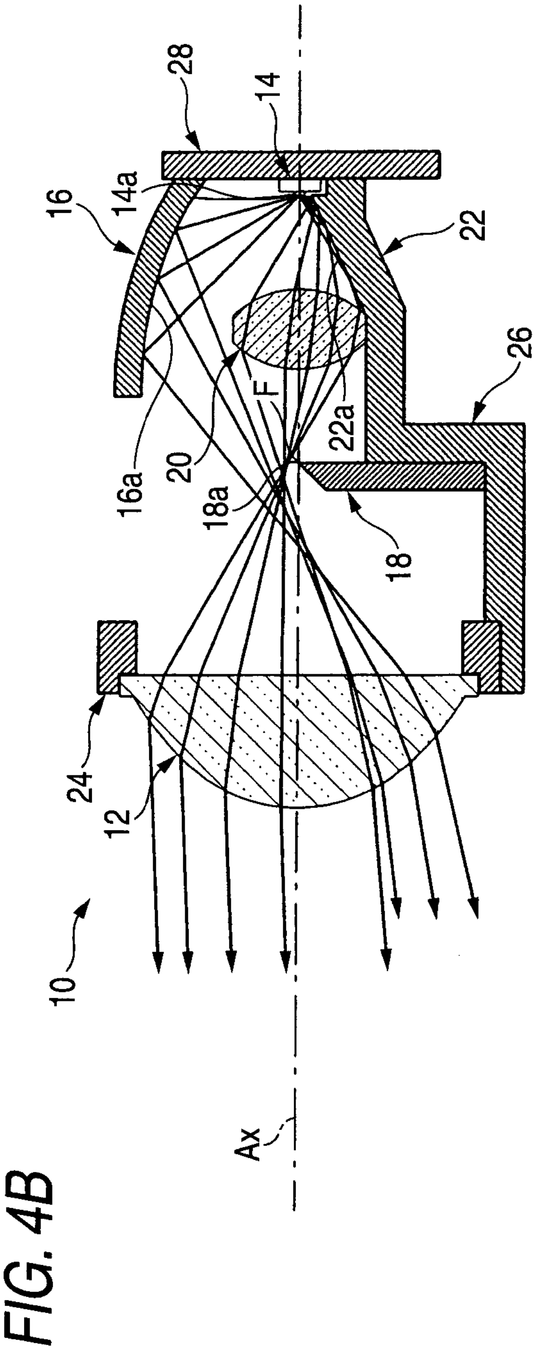

FIGS. 4A and 4B are views similar to FIG. 2. FIG. 4A is a view showing optical paths of the light, which is incident directly on the convex lens 20, out of an emergent light from the light emitting device 14, and FIG. 4B is a view showing optical paths of the light, which is incident on the reflector 16 or the additional reflector 22, out of the emergent light from the light emitting device 14.

As shown in FIG. 4A and FIG. 3, the emergent light emitted from the light emitting chip 14*a* and directed forward is incident on the convex lens 20, then is deflected by the convex lens 20 to go toward the optical axis Ax, and then is converged into the vicinity of the rear side focal point F of the projection lens 12. Then, this light is emitted forward from the projection lens 12 as a substantially parallel light in a condition that a part of this light is shielded by the shade 18.

In contrast, as shown in FIG. 4B and FIG. 3, most of the emergent light from the light emitting chip 14*a* directed to a surrounding space of the convex lens 20 is incident on the reflector 16 or the additional reflector 22.

In this case, the light directed from the light emitting chip 14*a* to the upper side and both right and left sides is incident on the reflector 16, and then is reflected forward by the reflector 16 to go toward the optical axis Ax. At that time, the light reflected by the reflecting surface 16*a* of the reflector 16 over the optical axis Ax is converged substantially into a spot located slightly ahead of the rear side focal point F of the projection lens 12, and the light reflected by the reflecting surface 16*a* on both right and left sides of the optical axis Ax is converged substantially into a spot located considerably ahead of the rear side focal point F of the projection lens 12. Accordingly, the reflected light from the reflector 16 is irradiated forward from the projection lens 12 as the light that is diffused slightly downward in the left and right directions in a condition that a part of this light is shielded by the shade 18.

Also, the light directed downward from the light emitting chip 14*a* is incident on the additional reflector 22, then is reflected forward by the additional reflector 22 to go toward the optical axis Ax and is incident on the convex lens 20, and then is deflected by the convex lens 20 to go toward the optical axis Ax. At that time, since the reflecting surface 22*a* of the additional reflector 22 is formed like the almost circular cone surface, the light reflected by the reflecting surface 22*a* in the area under the optical axis Ax to be incident on the convex lens 20 is converged substantially into a point that is located near the front oblique upper side of the rear side focal point F of the projection lens 12. Similarly, the light reflected by the reflecting surface 22*a* of the additional reflector 22 in the side area of the optical axis Ax to be incident on the convex lens 20 is converged substantially into a point that is located near the front oblique side area of the rear side focal point F of the projection lens 12. In this case, since an inclination angle of the reflecting surface 22*a* in a sectional position that is close to the horizontal plane on both right and left sides of the light emitting chip 14*a* is set smaller than that in a sectional position that is close to the vertical plane under the light emitting chip 14*a*, the light reflected from the side area of the optical axis Ax to be incident on the convex lens 20 passes through the rear side focal plane of the projection lens 12 in a position that is slightly away from the rear side focal point F of the projection lens 12, in contrast to the light reflected from the area under the optical axis Ax to be incident on the convex lens 20.

Figure 5:
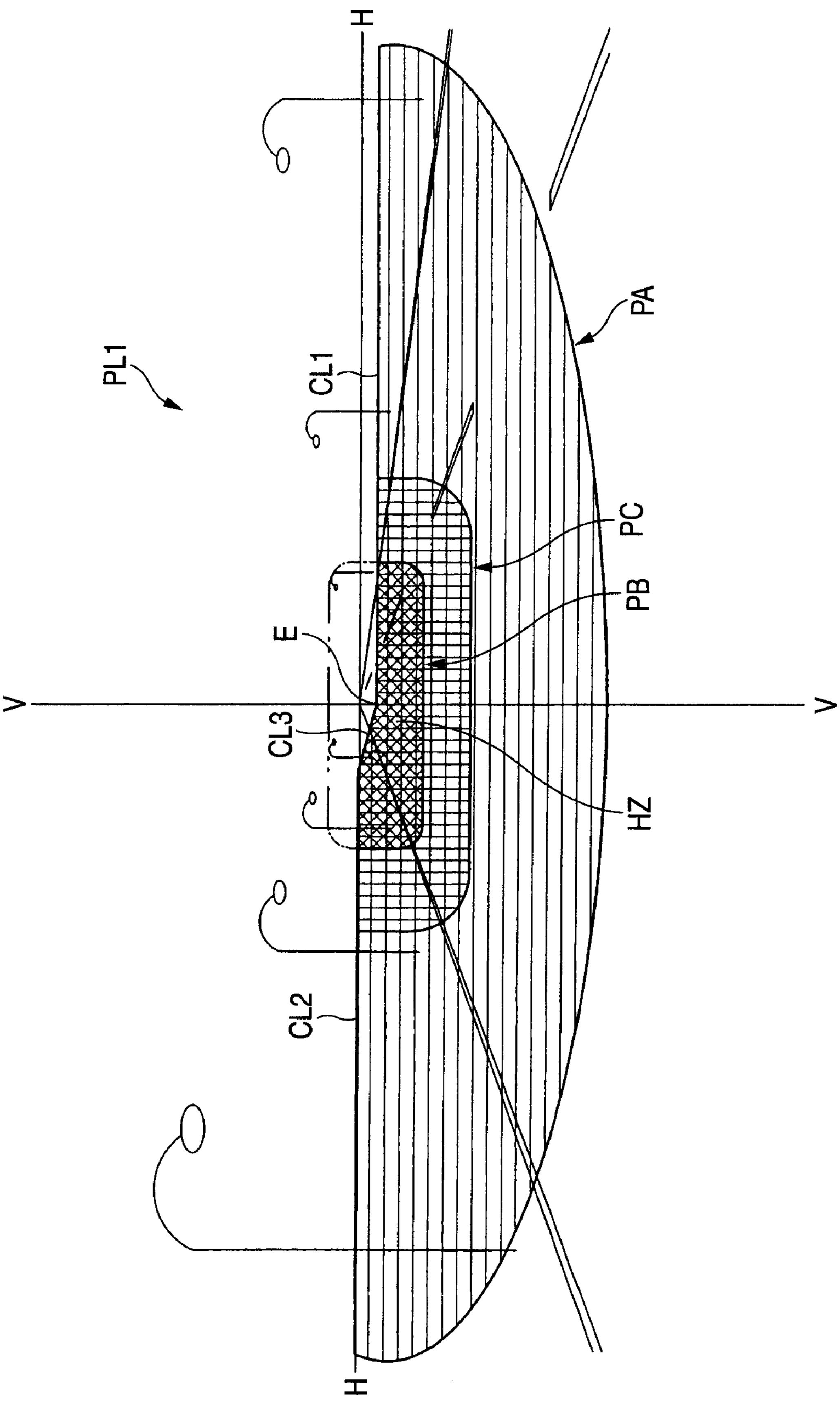
FIG. 5 is a view showing perspectively a low-beam light distribution pattern formed on a virtual vertical screen, which is arranged in a position in front of the vehicle by 25 m, by a light being emitted forward from the above lighting unit.

FIG. 5 is a view showing perspectively a low-beam light distribution pattern PL1 formed on a virtual vertical screen, which is arranged in a position in front of the vehicle by 25 m, by the light being emitted forward from the lighting unit 10 according to the present embodiment.

As shown in FIG. 5, a low-beam light distribution pattern PL1 is the leftward-directed low-beam light distribution pattern, and has cut-off lines CL1, CL2, CL3 at its upper end edge at different levels on the left and right side respectively.

The cut-off lines CL1, CL2, CL3 extend horizontally at different levels on the left and right side at a V-V boundary line that is a vertical line passing through H-V as a focal point of the lighting equipment in the front direction. The right side of the V-V line is formed as the opposite lane side cut-off line CL1 to extend in the horizontal direction, and the left side of the V-V line is formed as the own lane side cut-off line CL2 to extend in the horizontal direction at the higher level than the opposite lane side cut-off line CL1. Also, an end portion of the own lane side cut-off line CL2 near the V-V line is formed as the oblique cut-off line CL3. This oblique cut-off line CL3 extends in the left upward direction at an inclination angle of 15° from an intersection point between the opposite lane side cut-off line CL1 and the V-V line.

In this low-beam light distribution pattern PL1, an elbow point E as an intersection point between the opposite lane side cut-off line CL1 and the V-V line is positioned below the V-V line by about 0.5 to 0.6°. This is because the optical axis Ax extends in the downward direction at about 0.5 to 0.6° to the longitudinal direction of the vehicle. Also, in this low-beam light distribution pattern PL1, a hot zone HZ as a high luminous intensity area is formed to surround the elbow point E.

This low-beam light distribution pattern PL1 is formed when an image of the light emitting chip 14*a*, which is formed on the rear side focal plane of the projection lens 12 by the light emitted from the light emitting chip 14*a* and reflected by the reflector 16 and the light emitted from the light emitting chip 14*a* to pass through the convex lens 20, is projected onto a virtual vertical screen by the projection lens 12 as an inverted projection image. The cut-off lines CL1, CL2, CL3 are formed as the inverted projection image of the upper end edge 18*a* of the shade 18.

This low-beam light distribution pattern PL1 is formed as a synthesized light distribution pattern of three light distribution patterns PA, PB, PC.

The light distribution pattern PA is a light distribution pattern that is formed by the light emitted from the light emitting chip 14*a* and reflected by the reflector 16. This light distribution pattern PA constitutes an outer shape of the low-beam light distribution pattern PL1 and portions away from the optical axis Ax in the cut-off lines CL1, CL2. This is because the reflected light from the reflector 16 passes through the rear side focal plane of the projection lens 12 in a position remote from the optical axis Ax over a wide range.

The light distribution pattern PB is a light distribution pattern that is formed by the light emitted from the light emitting chip 14*a* to be directly incident on the convex lens 20. This light distribution pattern PB is formed as a small bright oblong light distribution pattern that surrounds the elbow point E. This is because the light emitted from the oblong light emitting chip 14*a* to be directly incident on the convex lens 20 is converged into the vicinity of the rear side focal point F of the projection lens 12. This light distribution pattern PB gives a projection image in which a portion indicated with a chain double-dashed line in FIG. 5 is cut away from the projection image of the light emitting chip 14*a* formed when the shade 18 is not present.

The hot zone HZ of the low-beam light distribution pattern PL1 is formed mainly by this light distribution pattern PB. At that time, a highest luminous intensity position of this hot zone HZ is positioned in the almost center of the projection image of the light emitting chip 14*a* formed when the shade 18 is not present. Therefore, this highest luminous intensity position is positioned near the elbow point E.

The light distribution pattern PC is a light distribution pattern that is formed by the light emitted from the light emitting chip 14*a* and reflected by the additional reflector 22 to be incident on the convex lens 20. This light distribution pattern PC is formed as the oblong light distribution pattern that surrounds the elbow point E via a space. This is because the light emitted from the oblong light emitting chip 14*a* and reflected by the additional reflector 22 to be incident on the convex lens 20 is converged substantially into a vicinity of the obliquely front upper area or a vicinity of the obliquely front side area of the rear side focal point F of the projection lens 12. A brightness of the hot zone HZ and a brightness of its peripheral area are increased further by the light distribution pattern PC.

As described in detail above, the lighting unit 10 of the vehicle headlamp according to the present embodiment is constructed as the projector type lighting unit equipped with the shade 18. Therefore, the low-beam light distribution pattern PL1 having the clear cut-off lines CL1, CL2, CL3 at its upper end can be formed.

Besides, in the lighting unit 10 of the vehicle headlamp according to the present embodiment, the convex lens 20 for converging the light from the light emitting chip 14*a* into the vicinity of the upper end edge 18*a* of the shade 18 is provided between the light emitting chip 14*a* serving as the light source and the shade 18. Therefore, the bright light source image can be formed on the vicinity of the upper end edge 18*a* of the shade 18 on the rear side focal plane of the projection lens 12 by this convex lens 20. Also, when this light source image is projected inversely by the projection lens 12, the small bright light distribution pattern PB to surround the elbow point E via a small space can be formed.

Therefore, a brightness of the hot zone HZ of the low-beam light distribution pattern PL1 that is formed by the light emission from the lighting unit 10 can be increased largely rather than the case where the low-beam light distribution pattern PL1 is formed only by the reflected light from the reflector 16. Also, the highest luminous intensity position can be set in the position near the cut-off lines CL1, CL2, CL3. As a result, a visibility of the far area on the road surface in front of the vehicle can be enhanced satisfactorily.

In addition, in the lighting unit 10 of the vehicle headlamp according to the present embodiment, the reflector 16 is arranged to cover the light emitting chip 14*a* and the convex lens 20 from the topside, and the additional reflector 22 for reflecting the light from the light emitting chip 14*a* to the convex lens 20 is provided on the lower side of the light emitting chip 14*a*. Therefore, not only the whole shape of the low-beam light distribution pattern PL1 is formed by the reflected light from the reflector 16, but also the image of the light emitting chip 14*a* reflected by the additional reflector 22 can be focused substantially on the upper area of the upper end edge 18*a* of the shade 18 by the convex lens 20 and then can be projected forward by the projection lens 12. Accordingly, the light distribution pattern PC that is one size larger than the hot zone HZ can be formed to overlap with the hot zone HZ. As a result, a brightness of the hot zone HZ and a brightness of its peripheral area can be increased further more.

Also, the lighting unit 10 of the vehicle head lamp according to the present embodiment is constructed by the light emitting chip 14*a* of the light emitting element 14 whose light source is directed forward. Therefore, following advantages and effects can be achieved.

In other words, most of the emergent light from the light emitting chip 14*a* is not incident on the reflector 16 and goes to the front side space. In this situation, since most of the light traveling to the front side space is incident on the convex lens 20, a utility factor of the luminous flux of the light from the light source can be enhanced. At that time, the light emitting element 14 is supported by the metal supporting plate 28 extending along a vertical plane that intersects orthogonally with the optical axis Ax, and a plurality of radiating fins 28*a* are formed on the back surface of this supporting plate 28. Therefore, this supporting plate 28 can be practically used as a heat sink. In this case, a distance from the light emitting element 14 arranged to direct forward to a plurality of radiating fins 28*a* is very short, and thus a heat radiation effect can be extremely enhanced.

In the above embodiment, explanation is made under the assumption that the light emitting chip 14*a* of the light emitting element 14 has an oblong rectangular light emitting surface of an about 1 mm×2 mm square. The light emitting chip may be constructed to have the light emitting surface of other shapes or sizes.

In the above embodiment, explanation is made under the assumption that the low-beam light distribution pattern PL1 is formed only by the irradiation light from the lighting unit 10. Of course, it is possible to form the low-beam light distribution pattern PL1 by using a combination of the irradiation light from the lighting unit 10 and the irradiation light from other lighting unit. At that time, the lighting unit 10 according to the present embodiment has the convex lens 20 that is suited to form the hot zone. Therefore, when the reflecting surface of the reflector 16 is set to such a shape that a convergent degree of the reflected light on the rear side focal plane of the projection lens 12 is increased and thus the light distribution pattern smaller than the light distribution pattern PA is formed, this lighting unit 10 can be fitted particularly to form the converging light distribution pattern.

Next, variations of the above embodiment will be explained hereunder.

Figure 6:
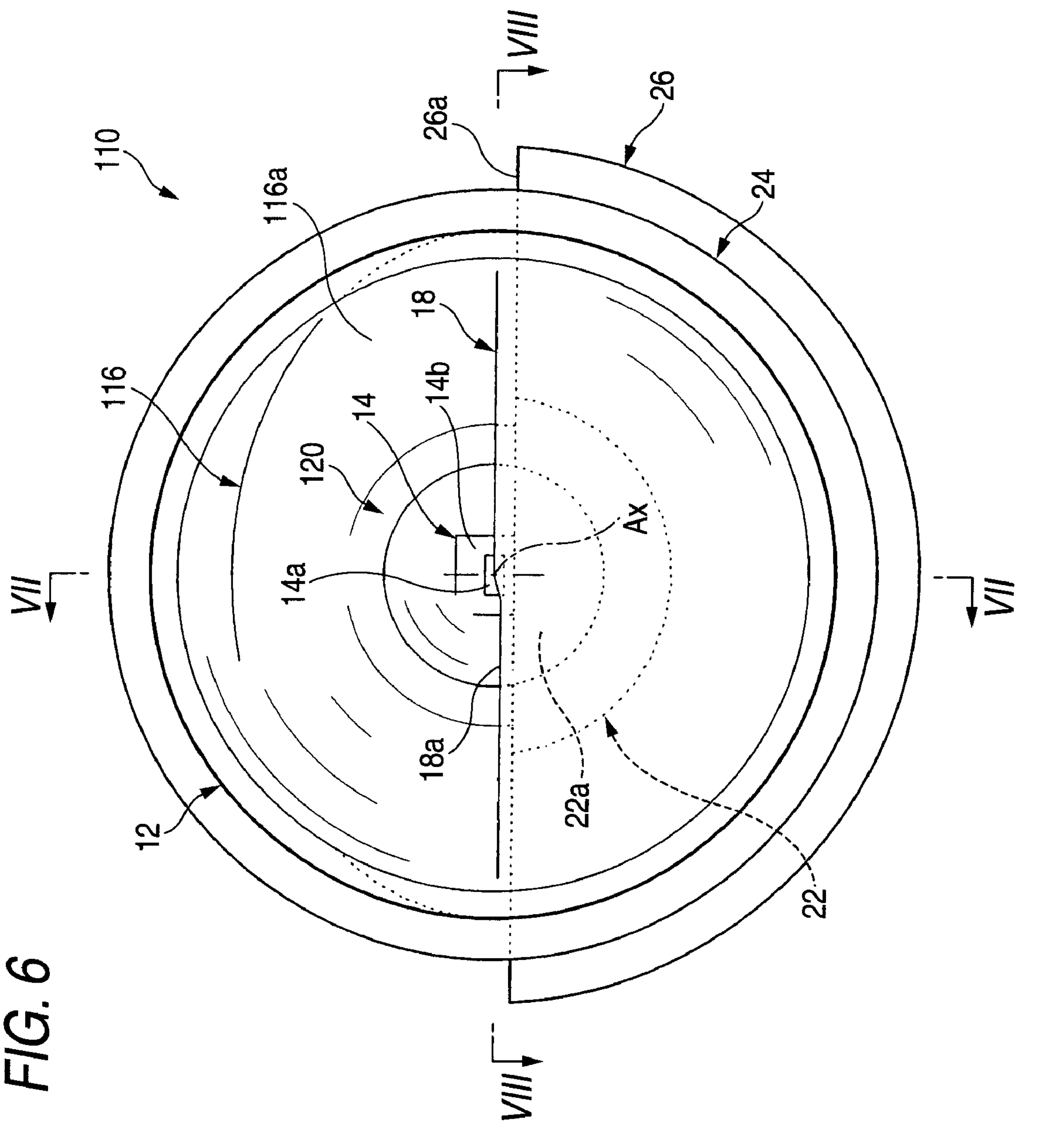
FIG. 6 is a front view showing a lighting unit for a vehicle headlamp according to a first variation of the embodiment.
Figure 7:
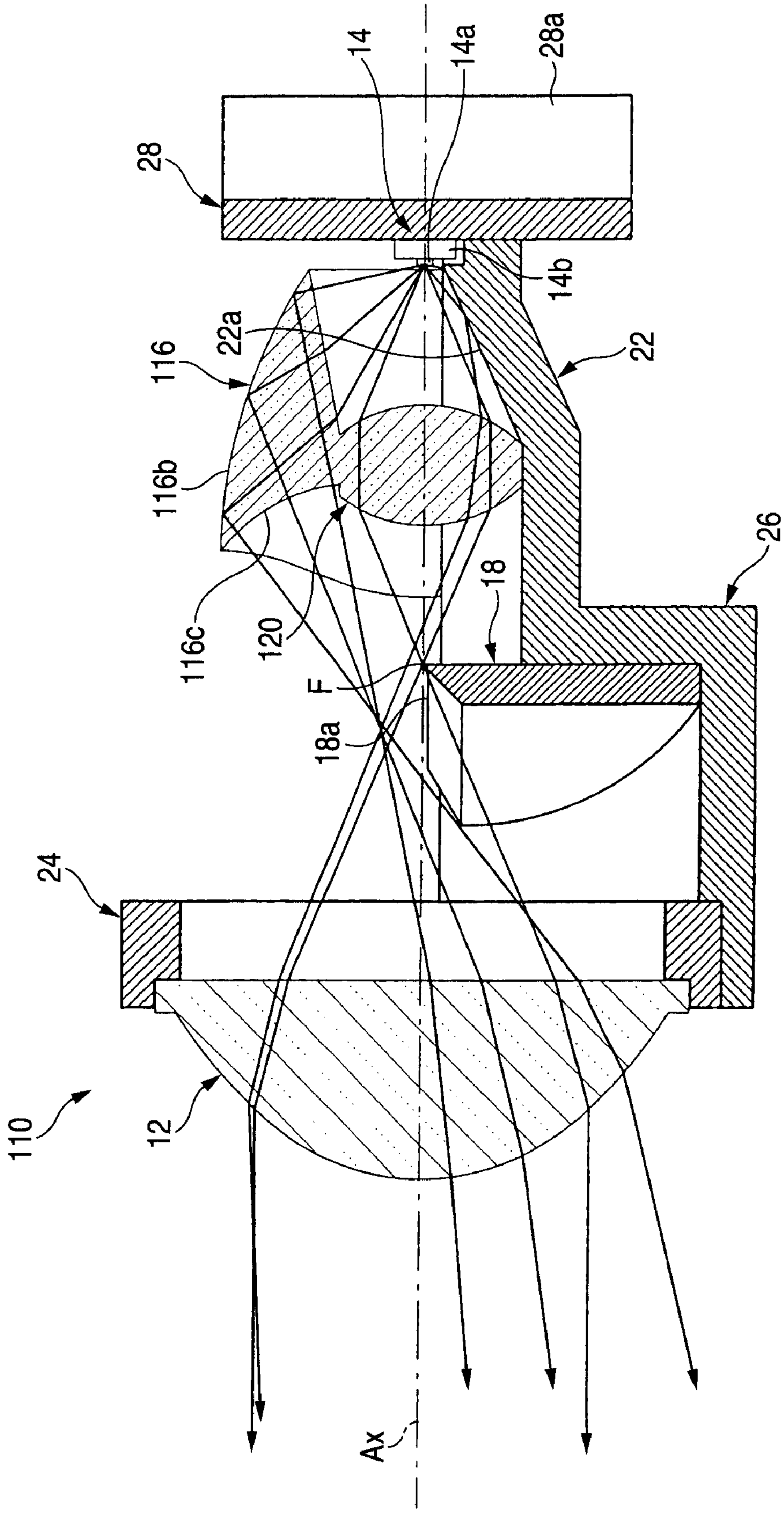
FIG. 7 is a sectional view taken along a VII-VII line in FIG. 6.
Figure 8:
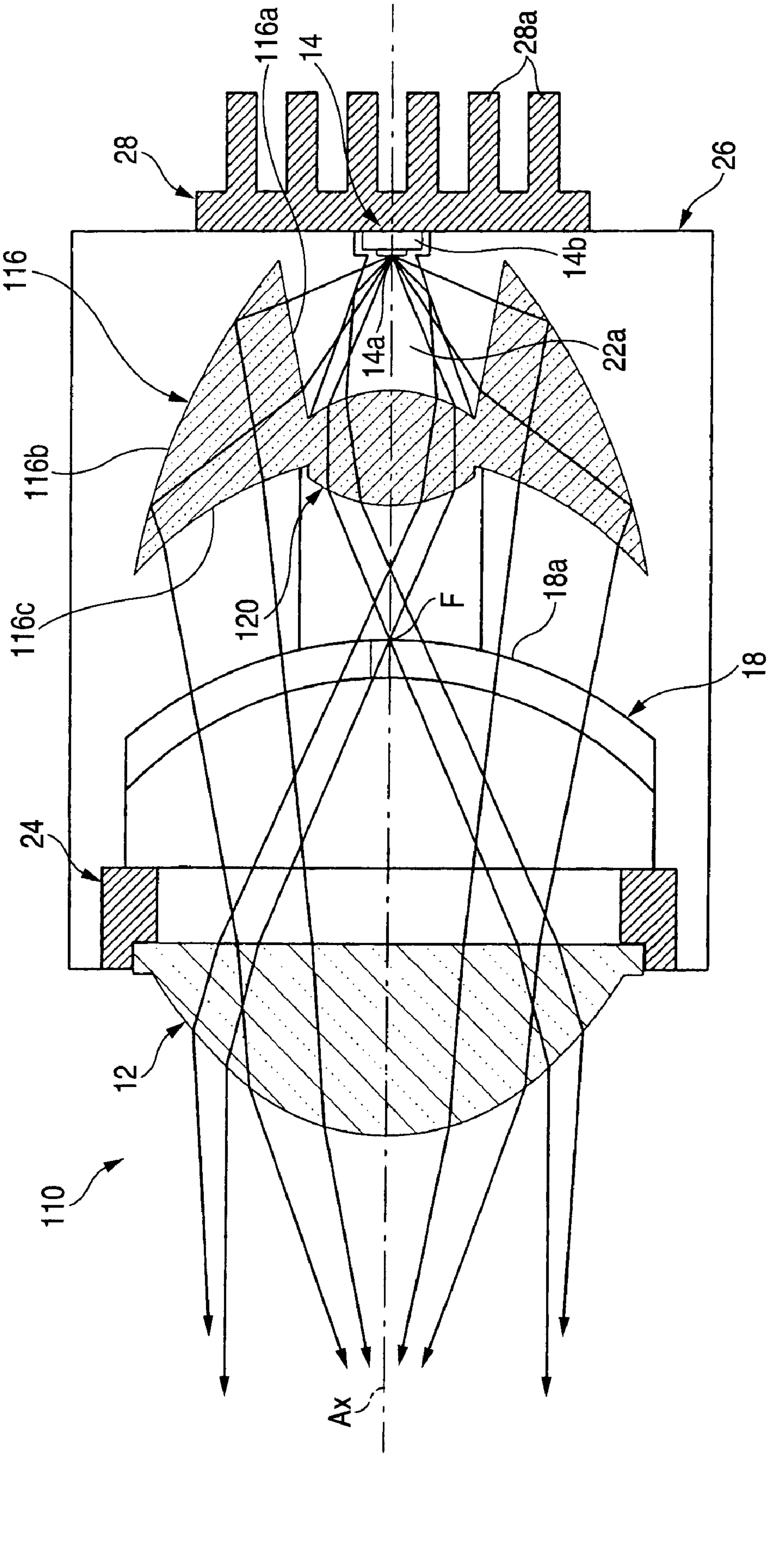
FIG. 8 is a sectional view taken along a VIII-VIII line in FIG. 6.

FIG. 6 is a front view showing a lighting unit 110 for a vehicle headlamp according to a first variation of the embodiment. Also, FIG. 7 is a sectional view taken along a VII-VII line in FIG. 6, and FIG. 8 is a sectional view taken along a VIII-VIII line in FIG. 6.

As shown in these Figures, a basic structure of the lighting unit 110 according to the present variation is similar to that in the above embodiment. But structures of a reflector 116 and a convex lens 120 are different from those in the above embodiment.

That is, the reflector 116 of the present variation is constructed by a translucent member (e.g., a member made of an acrylic resin, a polycarbonate resin, or the like) that is formed integrally with the convex lens 120.

The reflector 116 is constructed to have an inner peripheral side surface 116*a* that extends backward from the outer peripheral edge of the rear-side surface of the convex lens 120, an outer peripheral side surface 116*b* for internal-reflecting forward the light of the light emitting chip 14*a* incident from the inner peripheral side surface 116*a* by virtue of a total reflection, and a front side surface 116*c* for emitting the reflected light from the outer peripheral side surface 116*b* forward.

The inner peripheral side surface 116*a* of this reflector 116 has a circular-cone shape whose diameter is expanded slightly backward. A position of the rear end edge is set in the almost same position as the light emitting surface of the light emitting chip 14*a*.

Also, the outer peripheral side surface 116*b* of this reflector 116 has the almost same shape as the reflecting surface 16*a* of the reflector 16 in the above embodiment. In this case, a sectional shape along a plane including the optical axis Ax is set such that the light emitted from the light emitting chip 14*a* and incident on the reflector 116 from the inner peripheral side surface 116*a* is internal-reflected totally by the outer peripheral side surface 116*b* by virtue of a total reflection. That is, tangential gradient angles in respective positions of the outer peripheral side surface 116*b* of the reflector 116 are set such that an incident angle of the light emitted from the light emitting chip 14*a* and incident from the inner peripheral side surface 116*a* into the outer peripheral side surface 116*b* is slightly larger than a critical angle of the material constituting the translucent member.

Also, the front side surface 116*c* of the reflector 116 is formed like a concave curved surface, and refracts the reflected light from the outer peripheral side surface 116*b* of the reflector 116 as the case may be. Namely, a sectional shape of the front side surface 116*c* taken along a plane containing the optical axis Ax is set in such a way that an optical path of the emergent light from the reflector has the almost same optical path as that in the reflector 16 in the above embodiment.

In the convex lens 120, the connection portion to the reflector 116 is formed at its outer periphery in a slightly smaller diameter than the convex lens 20 in the above embodiment. But remaining structures are similar to those of the convex lens 20 in the above embodiment.

In the lighting unit 110 according to the present variation, the light, which is not incident on the convex lens 120 and goes to its outer peripheral space, out of the emergent light from the light emitting chip 14*a* is incident totally on the reflector 116 from the inner peripheral side surface 116*a* of the reflector 116. At that time, the light incident on the reflector 116 near the outer peripheral edge of the convex lens 120 is refracted largely by the inner peripheral side surface 116*a* in the direction to go away from the optical axis Ax, and arrives at the outer peripheral side surface 116*b*. Then, the light being internal-reflected by the outer peripheral side surface 116*b* by virtue of a total reflection is emergent from the front side surface 116*c* of the reflector 116.

Accordingly, the light distribution pattern similar to the light distribution pattern PA formed by the reflected light from the reflector 16 in the above embodiment can be formed by the emergent light from the reflector 116 of the present variation. At that time, in the present variation, the light from the light emitting chip 14*a*, which is not incident on the convex lens 20 but directed to its outer peripheral side space, is totally utilized as the forward emission light by the reflector 116. Therefore, the light distribution pattern that is brighter than the light distribution pattern PA can be formed.

Following advantages and effects can be achieved by employing the lighting unit 110 according to the present variation.

That is, in the lighting unit 10 according to the present embodiment, the light, which is directed to its outer peripheral edge of the convex lens 120, out of the light that is not incident on the convex lens 120 but directed to its outer peripheral side space is not incident on the reflector 16. Such light cannot be effectively utilized as the forward emission light. However, in the lighting unit 110 according to the present variation, such light can be effectively utilized as the forward emission light when such light is incident on the reflector 116. Therefore, a utility factor of the luminous flux of the light from the light source can be enhanced.

Figure 9:
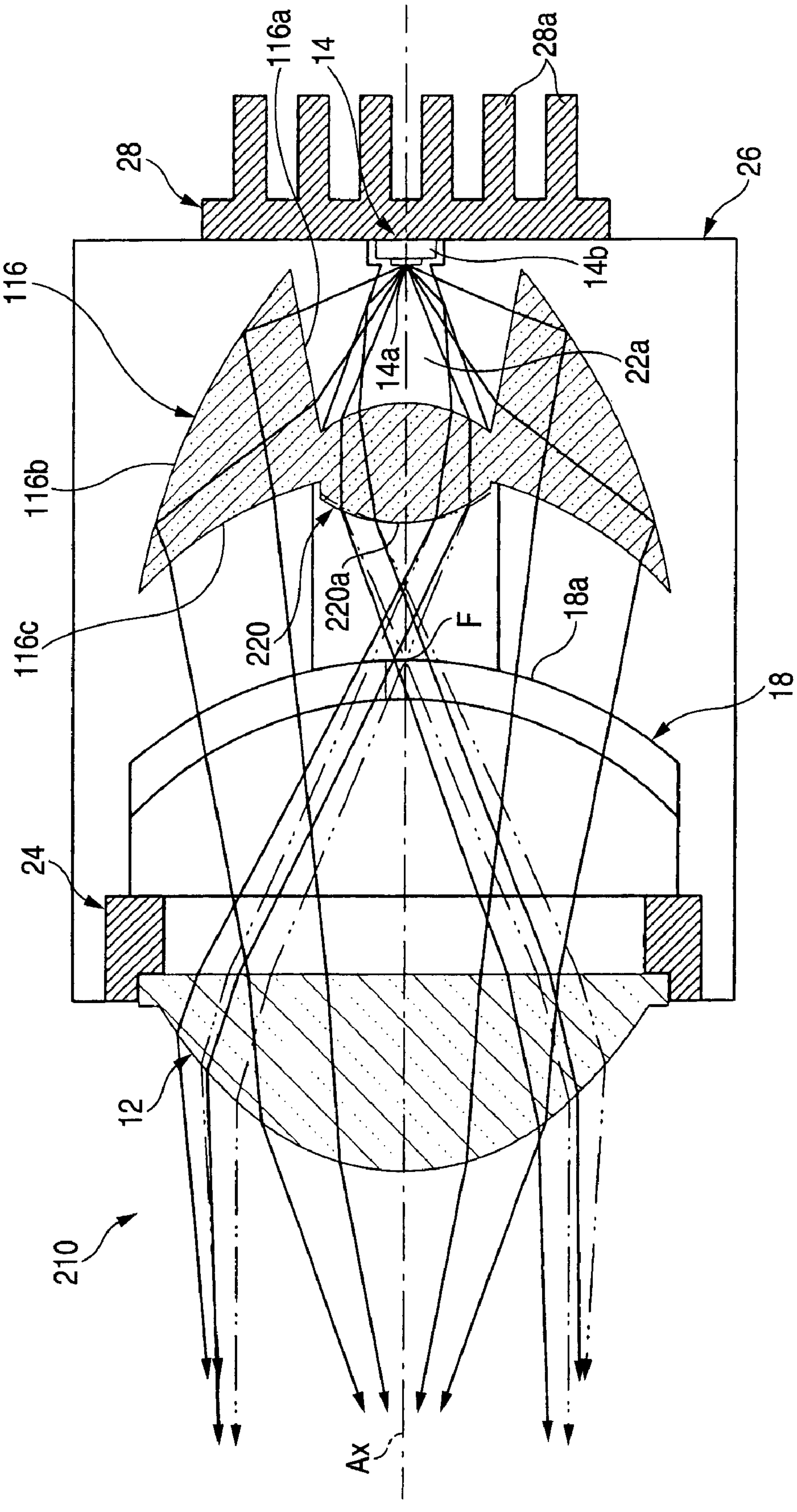
FIG. 9 is a front view showing a lighting unit for a vehicle headlamp according to a second variation of the embodiment.

FIG. 9 is a front view similar to FIG. 8, showing a lighting unit 210 for a vehicle headlamp according to a second variation of the embodiment.

As shown in FIG. 9, a basic structure of the lighting unit 210 according to the present variation is similar to that in the above first variation. But a structure of a convex lens 220 is different from that in the above first variation.

That is, a basic structure of the convex lens 220 of the present variation is similar to the convex lens 120 in the above first variation. But a shape of a front side surface 220*a* is different from that of the convex lens 120 in the above first variation.

Concretely, a sectional shape of the front side surface 220*a* of the convex lens 220 taken along the horizontal plane is bilaterally asymmetrical, and the right-side portion with respect to the optical axis Ax is formed thick and the left-side portion is formed thin. In this case, a sectional shape taken along a vertical plane of the front side surface 220*a* is similar to that of the convex lens 120 in the above first variation.

Therefore, the light emitted from the light emitting chip 14*a* and incident directly on the convex lens 220 is deflected by the front side surface 220*a* to go toward the optical axis Ax. At that time, such light is emergent totally to slightly rightward direction rather than the case of the convex lens 120 in the above first variation (the optical path is indicated with a chain double-dashed line in FIG. 6), and is converged into a point on the right side of the rear side focal point F of the projection lens 12.

Also, the light emitted from the light emitting chip 14*a* and reflected by the additional reflector 22 to be incident on the convex lens 220 is deflected by the front side surface 220*a* to go toward the optical axis Ax. At that time, such light is emergent totally to slightly rightward direction rather than the case of the convex lens 120 in the above first variation (the optical path is indicated with a chain double-dashed line in FIG. 6).

Figure 10:
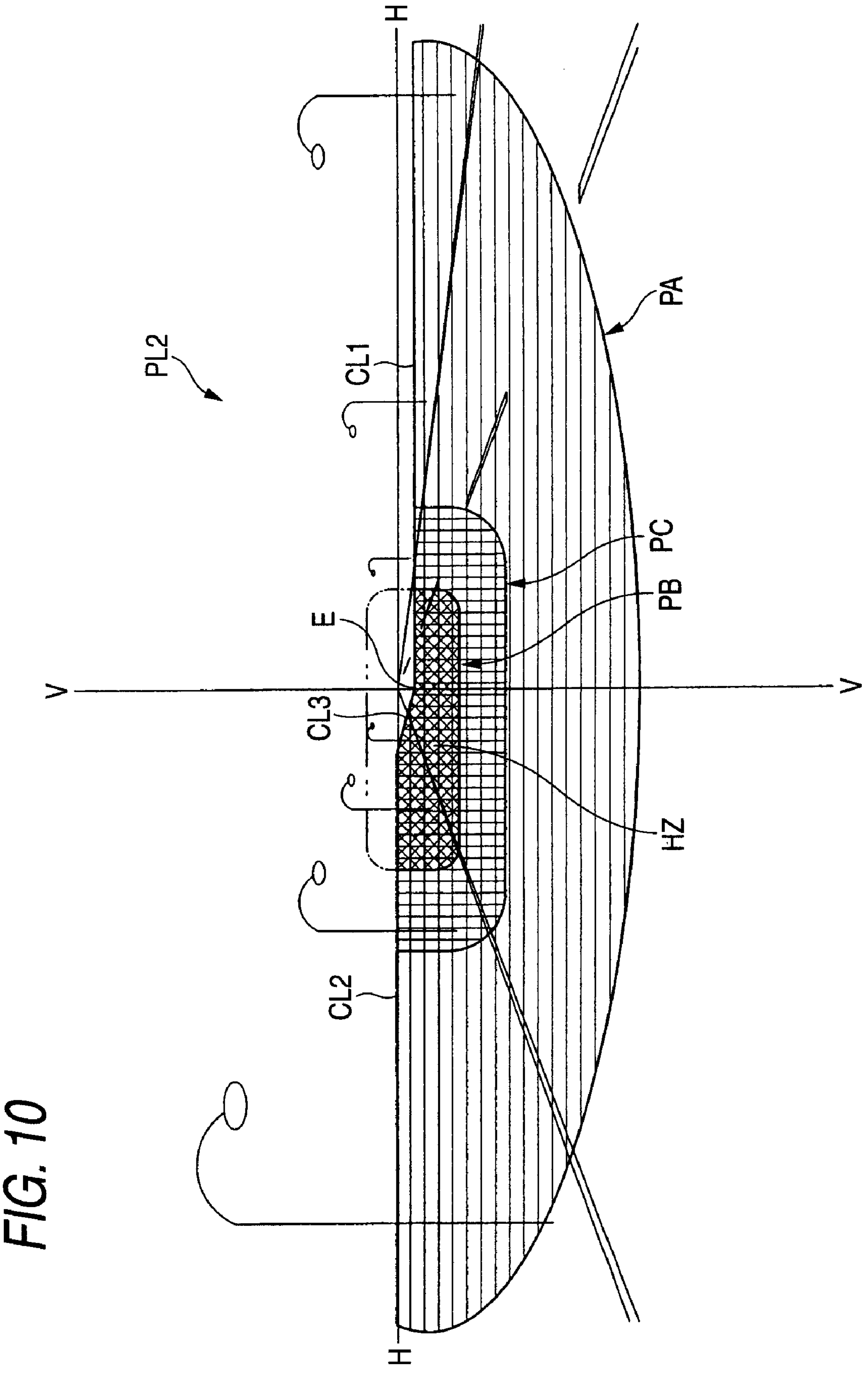
FIG. 10 is a view showing perspectively a low-beam light distribution pattern formed on the virtual vertical screen by a light being emitted forward from the lighting unit according to the second variation.

FIG. 10 is a view showing perspectively a low-beam light distribution pattern PL2 formed on the virtual vertical screen, which is arranged in a position in front of the vehicle by 25 m, by a light being emitted forward from the lighting unit 210 according to the present variation.

As shown in FIG. 10, like the low-beam light distribution pattern PL1 formed in the above embodiment (and the above first variation), the low-beam light distribution pattern PL2 is formed as a synthesized light distribution pattern of three light distribution patterns PA, PB, PC. Also, outer shapes of these light distribution patterns PA, PB, PC are similar to those in the low-beam light distribution pattern PL1.

In this case, in the low-beam light distribution pattern PL2, the forming positions of the light distribution patterns PB, PC are displaced slightly leftward from the forming positions of the light distribution patterns PB, PC in the low-beam light distribution pattern PL1, and accordingly the hot zone HZ is displaced leftward from the hot zone HZ of the low-beam light distribution pattern PL1. This is because the front side surface 220*a* of the convex lens 220 is formed bilaterally asymmetrically, and therefore the emergent light from the convex lens 220 passes through the rear side focal plane of the projection lens 12 in a position that is positioned slightly rightward rather than the case of the convex lens 20 in the above embodiment (and the convex lens 120 in the first variation).

When the lighting unit 210 according to the present variation is employed, the hot zone HZ of the low-beam light distribution pattern PL2 can be formed to surround the elbow point E slightly leftward and the highest luminous intensity position can be set in a position that is slightly on the left side of the elbow point E. As a result, a visibility of the far area on the road surface in front of the vehicle including the shoulder portion of a road on the own lane side can be enhanced satisfactorily, and also such a situation can be prevented that the portion of the road surface in front of the vehicle on the opposite lane side becomes unnecessarily bright.

In this case, like the lighting unit 210 according to the second variation, a curvature of the curved line constituting the sectional shape taken along the horizontal plane of the front side surface can beset to a value different from a curvature of the curved line constituting the sectional shape taken along the vertical plane of the convex lens 120 in the first variation, instead of the structure that the front side surface 220*a* of the convex lens 220 is formed bilaterally asymmetrically. Accordingly, the light distribution patterns PB, PC can be distributed slightly in the lateral direction.

While description has been made in connection with specific exemplary embodiments, variations and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

10, 110, 210 lighting unit
12 projection lens
14 light emitting element
14*a* light emitting chip
14*b* substrate
16, 116 reflector
16*a*, 22*a* reflecting surface
18 shade
18*a* upper end edge
20, 120, 220 convex lens
22 additional reflector
24 lens holder
26 base member
26*a* upper surface
28 supporting plate
28*a* radiating fin
116*a* inner peripheral side surface
116*b* outer peripheral side surface
116*c*, 220*a* front side surface
Ax optical axis
CL1 opposite lane side cut-off line
CL2 own lane side cut-off line
CL3 oblique cut-off line
E elbow point
F rear side focal point
HZ hot zone
PA, PB, PC light distribution pattern
PL1, PL2 low-beam light distribution pattern

What is claimed is:

1. A lighting unit for a vehicle headlamp, comprising:

a projection lens arranged on an optical axis extending in a longitudinal direction of a vehicle;

a light source arranged on a rear side of a rear side focal point of the projection lens;

a reflector configured to reflect forward a light from the light source toward the optical axis;

a shade arranged such that an upper end edge of the shade passes through a vicinity of the rear side focal point and configured to shield a part of a reflected light from the reflector; and a convex lens arranged between the light source and the shade and configured to converge the light from the light source into the vicinity of the upper end edge of the shade;

wherein the reflector is arranged to cover the light source and the convex lens from a top side, and an additional reflector configured to reflect the light from the light source to the convex lens and arranged below the light source.

2. The lighting unit according to claim 1, wherein the reflector is formed of a translucent member that is formed integrally with the convex lens, and the reflector includes:

an inner peripheral side surface that extends backward from an outer peripheral edge of a rear side surface of the convex lens;

an outer peripheral side surface for internal-reflecting forward the light of the light source incident from the inner peripheral side surface by virtue of a total reflection; and a front side surface for emitting a reflected light from the outer peripheral side surface forward.

3. The lighting unit according to claim 1, wherein the light source comprises a light emitting chip of a light emitting element that is arranged to direct forward.

4. The lighting unit according to claim 3, wherein the light emitting element is supported by a metal supporting plate extending along a vertical plane intersecting orthogonally with the optical axis, and a plurality of radiating fins is formed on a rear surface of the supporting plate.

* * * * *